United States Patent
Rademacher et al.

(10) Patent No.: US 6,256,336 B1
(45) Date of Patent: *Jul. 3, 2001

(54) METHOD AND APPARATUS FOR DETECTING ITEMS OF INFORMATION TRANSMITTED ACCORDING TO THE DS-CDMA PRINCIPLE IN A RECEIVER APPARATUS

(75) Inventors: Leo Rademacher, Holzkirchen; Zoran Gardijan, Munich, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/874,966

(22) Filed: Jun. 13, 1997

(30) Foreign Application Priority Data

Jun. 13, 1996 (DE) .............................................. 196 23 667

(51) Int. Cl.$^7$ ...................................................... H04K 1/00
(52) U.S. Cl. ........................... 375/140; 375/349; 370/342
(58) Field of Search ..................... 375/200, 206, 375/208, 229, 346, 349, 130, 140, 141, 146, 147; 370/320, 342, 479; 455/54.1, 56.1, 65

(56) References Cited

U.S. PATENT DOCUMENTS

| | | | |
|---|---|---|---|
| 5,377,226 | * 12/1994 | Davis | 370/342 |
| 5,414,699 | * 5/1995 | Lee | 370/342 |
| 5,719,899 | * 2/1998 | Thielecke et al. | 375/206 |

FOREIGN PATENT DOCUMENTS

| | | | |
|---|---|---|---|
| 195 491 48 | 12/1995 | (DE) . | |
| 0 701 344 A1 | 3/1996 | (EP) . | |
| WO 95/22209 | * 8/1995 | (WO) | H04B/7/26 |

* cited by examiner

*Primary Examiner*—Stephen Chin
*Assistant Examiner*—Chieh M. Fan
(74) *Attorney, Agent, or Firm*—Bell, Boyd & Lloyd LLC

(57) ABSTRACT

A method and apparatus for detecting items of information transmitted according to the DS-CDMA principle in a receiver apparatus. According to the invention, the detection of items of information transmitted according to the DS-CDMA principle ensues in a receiver apparatus in that, given the presence of the spread codes of at least two connections, the items of information related to the individual connections are separated in a first step, and an individual equalization of the items of information related to the individual connections ensues thereupon. The invention can be used advantageously in mobile radiotelephone terminal apparatuses and base stations that operate according to the CDMA principle.

17 Claims, 2 Drawing Sheets

METHOD AND APPARATUS FOR DETECTING ITEMS OF INFORMATION TRANSMITTED ACCORDING TO THE DS-CDMA PRINCIPLE IN A RECEIVER APPARATUS

BACKGROUND OF THE INVENTION

1. Field of the Invention

The present invention is directed to a signal evaluation apparatus (DSP), and method, for detecting items of information transmitted according to the DS-CDMA (Direct Sequence—Code Division Multiple Access) principle wherein: (a) the items of information, dependent on the time t, of several connectors k are simultaneously transmitted in a frequency channel; and (b) the reception signals (e(t)) received by the signal evaluation apparatus are formed by the convolution of transmission signals ($d_k(t)$) with individual channel coefficients ($h_k(t)$) representing transmission channels and with the spread codes ($c_k(t)$) of the individual connections k.

2. Description of the Prior Art

In the transmission of digital signals from a transmitter apparatus to a receiver apparatus via time-variant channels, (e.g., non-stationary radio channels), there occurs runtime differences of the signal components received over the individual detours of the multipath channel as a result of the multipath propagation. In the signal detection of relatively high bitrates (e.g., in the GSM mobile radiotelephone system), these runtime differences lead to extremely strong and time-variant adjacent symbol interferences (inter-symbol interferences) of the transmitted symbols. Such inter-symbol interferences of signal components can amount to the temporal displacement of several symbols of useful information. In order to still be able to recognize the signal symbols under such influences, adaptive echo equalizers have been used; e.g., the Viterbi algorithm for the rapid finding of an adequate equalization optimum is applied.

An estimate of the complex filter coefficients of the radio channel, which ensues using a channel estimator, is a precondition for the equalization of adjacent symbol interference. For example, it is known from the GSM mobile radiotelephone system that the channel estimator adequately specifies the radio channel by means of an evaluation of a training sequence contained in each radio block. These complex filter coefficients are obtained by means of correlation and evaluate the temporal distribution, caused by the multipath propagation, of the signal components of the reception signals—also called a complex impulse response of the radio channel. Thus, each of these channel coefficients represents the complex integral of the level value of all signal components falling within the evaluation time period of the duration of a symbol. These channel co-efficients are determined by means of standard matching algorithms such as LMS (least mean square) or RLS (recursive least square).

The channel coefficients are supplied to the signal detection, and respectively represent, for the duration of a radio block, a basis of calculation for an adequately reliable detection of the symbols transmitted in this radio block. Since, as a rule, non-stationary radio channels are of concern, the channel coefficients must be adapted per radio block to the changes in the radio channel. Erroneous decisions during adaptation endanger the stability of the signal detection and ultimately lead to errors in detection.

When detecting items of information according to the DS-CDMA principle, additional problems arise. In the radio channel, the information of several connections is transmitted on the same carrier frequency at the same time. The connections are thereby distinguished in a spread code that respectively characterizes each individual connection. Upon reception of the signals from different signal sources, as is typical, for example, in this multipoint-to-point DS-CDMA transmission scenario (i.e., in the uplink of a CDMA receiver apparatus of a base station in mobile radiotelephone systems), the signals spread using different spread codes yet arrive at the reception site at the same time. Apart from the different spread codes, these signals also have different runtimes, are subject to different detour profiles and have different levels that are compensated by means of a relatively exact and quickly reacting power control in order to avoid strong disturbances.

The individual spread codes of the connections are typically orthogonal to one another. The individual signals must be separated from the summation mixture by means of correlation with the individual code. The different runtimes of the radio paths involved, which are to be equated with an imperfect synchronization of the signals, as well as the different channel impulse responses produce mutual interferences (multiple access interference=MAI). The use of matched filters in the receiver apparatus thereby supplies a non-negligible cross-correlation with interfering signal portions of other spread codes.

From the German patent application 195 491 48.3, it is known to additionally take into account the spread codes of additional connections upon reception, and detection, of items of information transmitted according to the CDMA principle. The method used is known as the JD-CDMA method (JD standing for Joint Detection). The separation and detection of the items of information of the individual connections are carried out in one step, by reconstructing the transmission signals according to a global optimization criterion and with knowledge of all the spread codes of the connections of the radio channel. The computing outlay required in a signal processing apparatus for this realization is, however, very large. As such, it is difficult to realize real-time processing while taking many spread codes into account.

SUMMARY OF THE INVENTION

An object of the present invention is to provide a method or, respectively, a signal processing apparatus for reducing the detection of items of information transmitted according to the DS-CDMA principle, with a reduced computing-related outlay, given at least two known spread codes.

This object is achieved in a method, and apparatus, for detecting items of information transmitted according to the DS-CDMA principle wherein: (a) the items of information, dependent on the time t, of several connectors k are simultaneously transmitted in a frequency channel; and (b) the reception signals (e(t)) received by the spiral evaluation apparatus are found by the convolution of transmission signals ($d_k(t)$) with individual channel coefficients ($h_k(t)$) representing transmission channels and with the spread codes ($c_k(t)$) of the individual connections k.

In an embodiment, items of information of several connections, which items are dependent on the time t, are simultaneously transmitted according to the DS-CDMA principle via a radio channel with a frequency. The reception signals received in a receiver apparatus are made up through the convolution of transmission signals with individual channel coefficients representing transmission channels and with the spread codes of the individual connections. In addition, there is a possible interference portion due to interference signals. The reception signals are converted into the base band and supplied for further detection. The spread codes of at least two connections are thereby present in the receiver apparatus. A separation of the items of information related to the individual connections initially occurs before an individual equalization of these items of information ensues. The mutual interferences between the connections are thereby taken into account in order to enable better resolution of the individual connections.

Due to the fact that, alongside the items of information concerning the separate connection, there are also items of information concerning further connections for signal detection, the detection can be improved significantly through, for example, the reduction of the distortion level after the removal of the signal portions from the further connections. It is true that the computing outlay for a simple calculation becomes larger due to the inventive solution. However, since the connections underlying the interferences and the spread codes of these connections are known and can be fixedly stored, the overall computing outlay is reduced in the constant separation and equalization process. The complexity of the two-step process for separation and individual equalization is less than that of the complex JD-CDMA method. In addition, it is possible to use methods and arrangements known, for example, from mobile radiotelephone systems for individual equalization. Such methods and arrangements also can be optimized for the individual connections.

The separation ensues in a code matrix and in a vector of the transmission signals convoluted with the channel coefficients. Accordingly, the code matrix is largely time-invariant (in particular for an unchanging composition of the spread codes on the radio channels), so that it can be stored in the receiver apparatus and does not have to be recalculated from radio block to radio block. Since, however, the transmission conditions and transmission signals are time-variant, the calculation of the matrix that takes into account the transmission signals and channel coefficients is carried out anew from radio block to radio block.

The code matrix with the spread codes of at least two connections is advantageously supplemented by additional indications so that this matrix enables the detection of the transmitted items of information even for larger inter-symbol interferences, given the inversion and later multiplication of the reception signals.

The additional indications, therefore, advantageously relate to known transmitted items of information that were already detected. These known, already-detected items of information can, for example, be symbols from an already-evaluated training sequence. The inversion of such an expanded code matrix is thereby improved and a drop in rank in the inversion is reduced, if necessary.

An equalization system to be calculated with a vector of the reception signals, which is equated with the product of the code matrix with the common vector of the radio channel and of the transmission signals, is expanded by a number of rows by expanding the vector of the reception signals and the code matrix by the product of the number of the known spread codes with a spread factor.

The additional indications for the supplementing of the code matrix are advantageously obtained by means of a feedback of already-detected known symbols, whereby the time displacement between the detected symbol and the symbol located in the separation is kept small. Considerable changes of the conditions in the radio channel are thereby prevented from occurring between the two symbols.

The inventive method and the inventive signal evaluation apparatus make it possible to use known, commercially available Viterbi equalizers/detectors for equalization and to use maximum likelihood estimators for detection. By these means, it is possible to compose the signal evaluation apparatus from standard modules.

For further improvement of the detection, there advantageously ensues an estimation of the difference between a received symbol and an evaluated symbol. If the deviation between the two values is large, this difference again can be inserted into the previously described equalization system, and the separation can be repeated.

Additional features and advantages of the present invention are described in, and will be apparent from, the detailed description of the presently preferred embodiments and from the drawings.

DESCRIPTION OF THE PREFERRED EMBODIMENT

Figure 1:
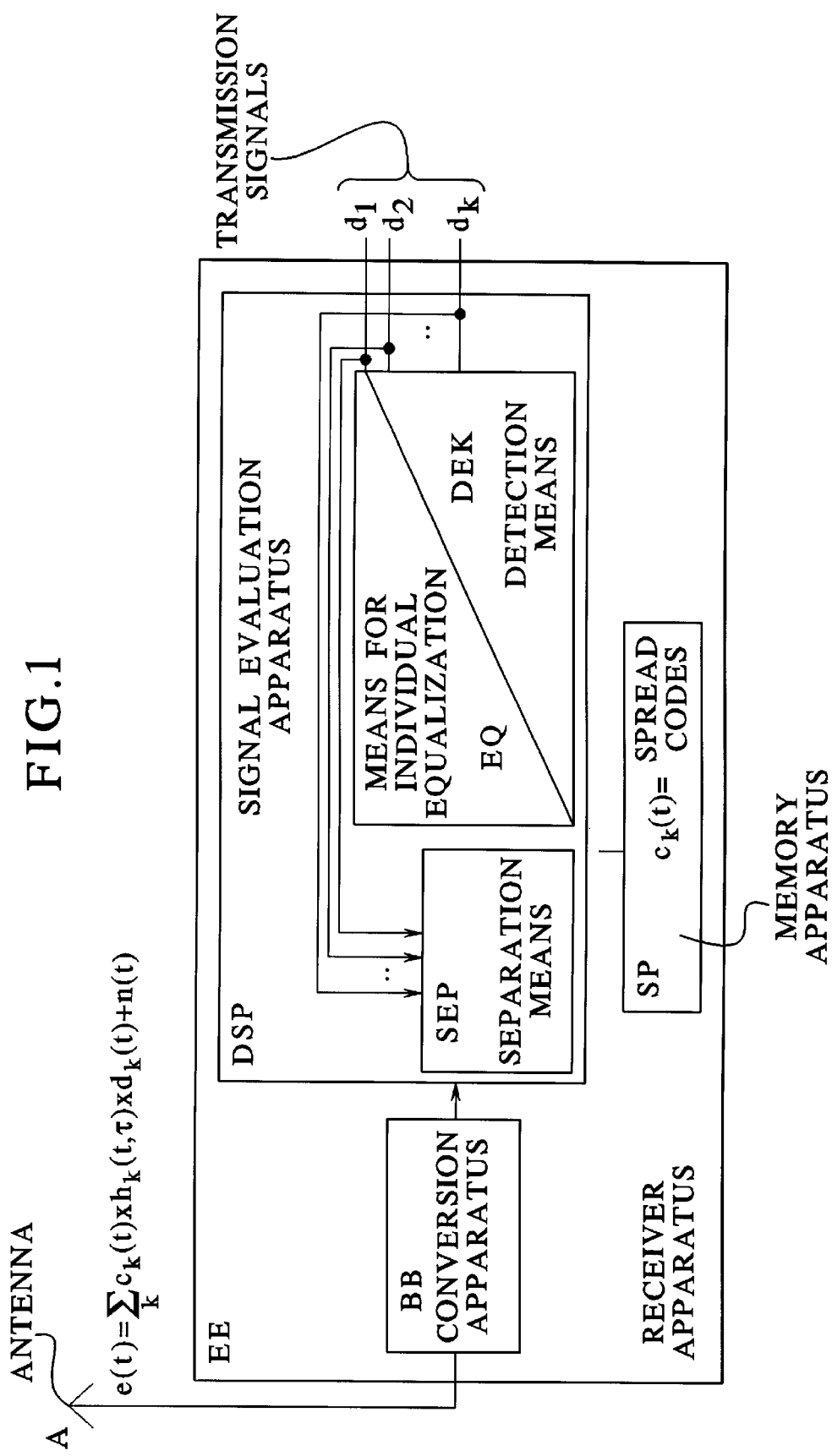
FIG. 1 shows an exemplary embodiment of a receiver apparatus for the selection of items of information transmitted according to the DS-CDMA principle in accordance with principles of the present invention.

The receiver apparatus EE according to FIG. 1 contains a conversion apparatus BB for the conversion of the reception signals e(t) received in an antenna A into the base band, a signal evaluation apparatus DSP and a memory apparatus SP. Additional means (not shown) serve for the controlling and power supply of the receiver apparatus EE. These means are known to those skilled in the art; e.g., from transceiver stations for mobile radio base stations.

The reception signals e(t) are composed of a signal mixture with a common carrier frequency of the individual connections k (k also serving as index of the connections) and an interference signal n(t). The signals of the individual connections k result from a convolution of the transmission signals $d_k(t)$ with the spread codes $c_k(t)$ and the channel coefficients $h_k(t)$ according to the following equation:

$$e(t) = \sum_k c_k(t) x h_k(t, \tau) x d_k(t) + n(t)$$

In the signal evaluation apparatus DSP, these reception signals e(t), after being converted into the base band, are evaluated. For this purpose, the signal evaluation apparatus DSP contains separation means SEP, means for individual equalization EQ and detection means DEK (EQ and DEK may be combined, if necessary). These means can be realized within the signal evaluation apparatus DSP by means of corresponding programming algorithms.

The receiver apparatus EE shown in FIG. 1 is, for example, marked as a base station of a mobile radiotelephone system so that in the result of detection by detection means DEK, the individually detected transmission signals $d_{1 \ldots k}$ of the further signal transmission are, for example, provided in wire-bound form to the next exchange. The memory apparatus SP serves for the storage of the known spread codes $c_k(t)$ of the individual connections k in the receiver apparatus EE. However, programs and other data can also be stored in this memory apparatus SP.

Figure 2:
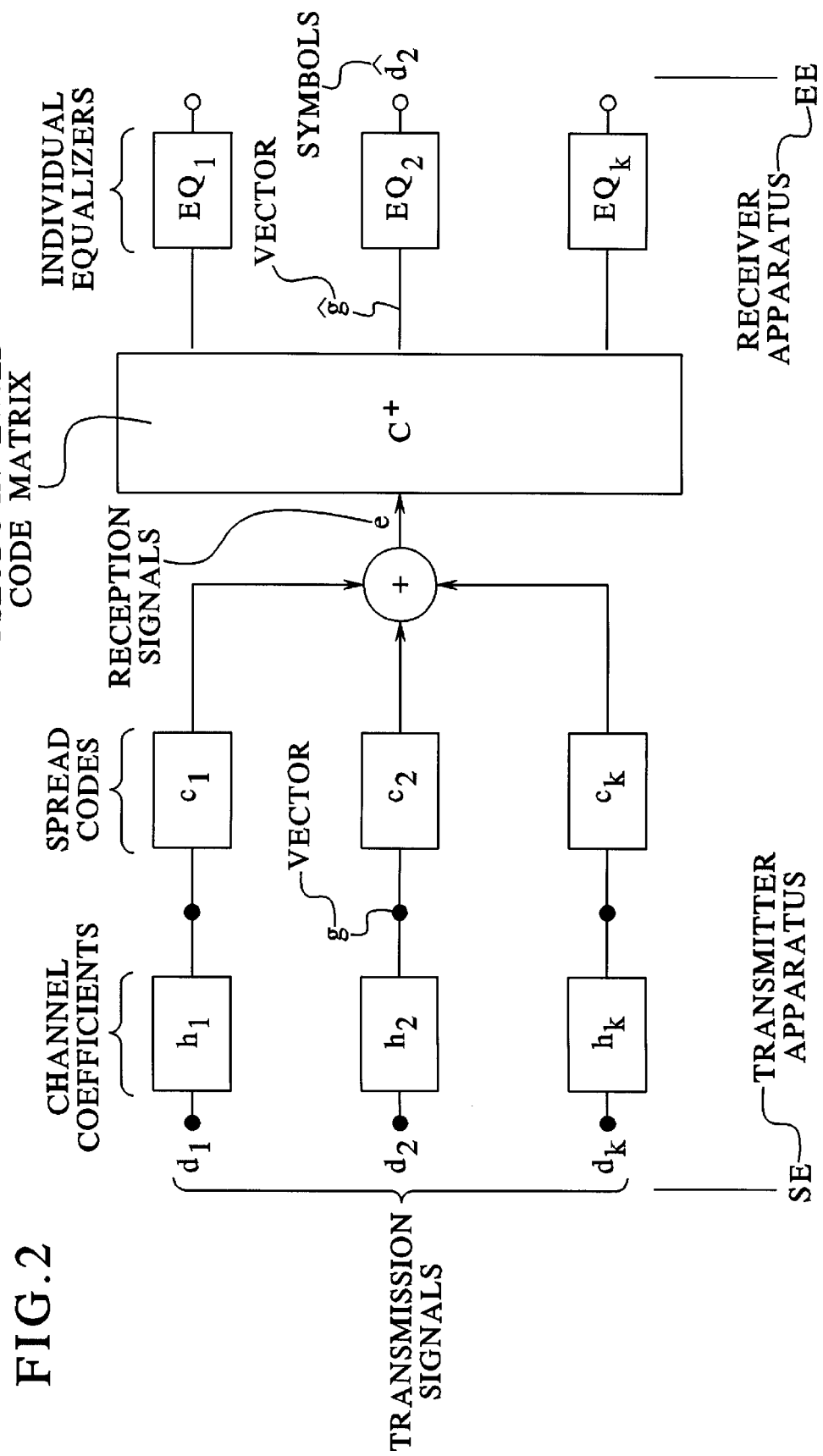
FIG. 2 shows a schematic diagram of the method steps for the transmission of items of information according to the DS-CDMA principle in accordance with the principles of the present invention.

According to FIG. 2, for the transmission of transmission signals $d_{1...k}$ from a transmitter apparatus SE to a receiver apparatus EE, the transmission signals $d_{1...k}$ are respectively spread using individual spread codes $c_{1...k}$, and are transmitted via radio channels with the individual channel coefficients $h_{1...k}$. The transmission signals $d_{1...k}$ and the channel coefficients $h_{1...k}$ together form a vector g, which designates the transmission signals $d_{1...k}$ distorted by the channel. In the physical transmission channel, the signals of the individual transmitter apparatuses SE are combined and yield the reception signals e (the continuous time dependency is neglected in the following by respectively regarding a discrete time point as the sampling time point) as they are received in an antenna apparatus A allocated to the receiver apparatus EE. The code matrix C is formed in the receiver apparatus EE, which matrix contains the spread codes $c_{1...k}$ of the individual connections k. The reception signals e are present at the input of the receiver apparatus EE according to the following equation:

$$e = Cg + n.$$

In the signal evaluation apparatus DSP, the pseudo-inverted code matrix $C^+$ (inverse of a non-quadratic matrix and pseudo-inverse of the code matrix C), which is stored in the memory apparatus SP, is multiplied by the reception signals e.

$$\hat{g} = C^+ \cdot e$$

A vector $\hat{g}$ thereby again arises, from which the items of information of the individual connections k are to be taken. The pseudo-inverted code matrix $C^+$ can thereby contain the spread codes $c_{1...k}$ as well as the connections both inside and outside the radio cells of the receiver apparatus EE.

The items of information of the vector $\hat{g}$ related to the individual connections k are now equalized in individual equalizers $EQ_{1...k}$ and are detected in the detection means DEK. If the separated and equalized items of information of different connections k are present, the overall information can be used to improve the detection of symbols of an individual connection (e.g., symbols $d_2$) by means of an iterative method with a feedback of the detected symbols.

If the interference signals n(t) are correlated, an inverse correlation matrix (noise covariance matrix) can be decomposed as follows:

$$R_n^{-1} = L' \cdot L,$$

wherein L' is the conjugated complex transpose of the matrix L so that a solution with minimal disturbing influence, $$\hat{g} = (LC)^+ Le,$$

results (wherein $(LC)^+$ is the pseuco-inverted matrix). In the following, the unit matrix is designated with I.

Before the cancellation of the spreading, the detection error is minimized, e.g., using the Vienna equation $(d-d|_{min}$ min), whereby uncorrelated interference signals, i.e., $R_n = \sigma^2 \cdot I$, are assumed:

$$\hat{g} = C'(CC' + \sigma^2 R_g^{-1})^{-1} e$$

$R_g$ is the correlation matrix of the reception signal detrimentally affected by the inter-symbol interference. $R_g$ is dependent on the transmission channel and is calculated by the following equalizer $EQ_{1...k}$. The equalizers $EQ_{1...k}$ can be realized in ways conventional for the TDMA method. However, the number of scanning values is increased by the spread factor.

With the assumption of uncorrelated inter-character interferences, i.e., $R_g^{-1} = I$, the Vienna equation is obtained:

$$\hat{g} = C'(CC' + \sigma^2 I)^{-1} e.$$

If time-independence can be assumed for $C'(CC' + \sigma^2 I)^{-1}$, then a fixed filing of this matrix is possible, e.g., by means of storage in an ASIC. The rest of the method is thereby simplified considerably. If the time-independence is not given and $R_g \neq I$, then this matrix is calculated again.

In order to avoid possible problems in the inversion of the code matrix C, this matrix is expanded by additional indications. The equation $$\hat{g} = C^+ \cdot e \text{ (e.g., for } C^+ = C'(CC' + \sigma^2 I[\text{or:}\sigma^2 I])^{-1})$$

is expanded by the number of rows i, which corresponds to the product of the number of connections k with the spread factor $N_{tC}$, wherein $N_{tC}$ represents the number of chips per symbol. The underdeterminedness of the equation system is thereby reduced, whereby the underdeterminedness is determined by the ratio of the number of unknown variables to the rank of the matrix.

For an improved detection, an expanded signal vector e of the reception signals e(t) must also be produced. This takes place by feeding back already-detected symbols, e.g., from a known training sequence, and inserting them into the vector of the reception signals e. It is thereby advantageous to keep the time difference between already-detected symbols and the symbols located in the separation small. This condition is fulfilled if the processing window for the detection is small, i.e., if a detection result is obtained rapidly. If the symbols are immediately determined by means of a maximum likelihood estimator, the expansion of the signal vector e can ensue by means of feedback.

In order to avoid detection errors, the momentary detection results are again formed on the transmission channel and the estimated noise-free reception signal e(t) is calculated (remodulation). If the difference between the reception signal e(t) and the reception signal $e_d(t)$ detected in this way is too large, then the difference is supplied an additional time to the inversion step for the code matrix C:

$$\hat{g} = \hat{g} + C^+ \cdot (e - e_d),$$

this time, however, without expansion of the code matrix C and of the signal vectors e, $e_d$. The result of the inversion step is added to the already-calculated vector g of the channel and to the transmission signals, and the detection is repeated according to the maximum likelihood method. This iteration step can be repeated several times.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method for detecting items of information transmitted according to the DS/CDMA principle in a receiver apparatus, the method comprising the steps of:

simultaneously transmitting items of information in transmission signals $d_k(t)$ dependent on time t, over several individual connections k via a frequency channel;

forming reception signals e(t), received by the receiver apparatus by convolution of the transmission signals $d_k(t)$ with individual channel coefficients $h_k(t)$ representing transmission channels and with spread codes $c_k(t)$ of the individual connections k, wherein the spread codes $c_k(t)$ of at least two connections k are present and known in the receiver apparatus;

converting the reception e(t) signals in a base band;

separating items of information $g_k(t)$ related to the individual connections k to form a connection separation in a first step, wherein mutual interferences between the connections are taken into account, and wherein an expanded code matrix, with the spread codes $c_k(t)$ of at least two connections k and with additional indications, is used for separating the reception signals e(t), the code matrix being inverted and multiplied by the reception signals e(t); and individually equalizing the items of information $g_k(t)$ related to the individual connections k in a second step which is subsequent to the first step of separating items of information.

2. The method as claimed in claim 1 wherein the additional indications are related to known transmitted items of information and wherein the code matrix is stored in the receiver apparatus.

3. The method as claimed in claim 1 wherein the additional indications are related to known transmitted items of information and wherein a pseudo-inverse of the code matrix is stored in the receiver apparatus.

4. The method as claimed in claim 3 wherein the known transmitted items of information are formed by symbols of a training sequence.

5. The method as claimed in claim 1 wherein, for processing the reception signals e(t), the spread codes $c_k(t)$ and the distorted items of information $g_k(t)$ related to the individual connections are organized in matrix form (e, C, g), and wherein a system of equations e=C*g is expanded by a number of rows i of the matrices e and C of the reception signals e(t) and of the spread codes $c_k(t)$, such that the number of rows i corresponds to a product of the number of the known spread codes $c_k(t)$ with a spread factor $N_{tC}$.

6. The method as claimed in claim 2 wherein for processing of the reception signals e(t), the spread codes $c_k(t)$ and the distorted items of information $g_k(t)$ related to the individual connections are organized in matrix form (e, C, g), and wherein a system of equations e=C*g is expanded by a number of rows I of the matrices e and C of the reception signals e(t) and of the spread codes $c_k(t)$, such that the number of rows I corresponds to a product of the number of the known spread codes $c_k(t)$ with a spread factor $N_{tC}$.

7. The method as claimed in claim 4 wherein for processing of the reception signals e(t), the spread codes $c_k(t)$ and the distorted items of information $g_k(t)$ related to the individual connections are organized in matrix form (e, C, g), and wherein a system of equations e=C*g is expanded by a number of rows i of the matrices e and C of the reception signals e(t) and of the spread codes $c_k(t)$, such that the number of rows i corresponds to a product of the number of the known spread codes $c_k(t)$ with a spread factor $(N_{tC})$.

8. The method as claimed in claim 1 wherein already-detected, known symbols of the transmitted items of information are fed back to the connection separation and a time displacement between a known symbol and a symbol located in the connection separation is kept small.

9. The method as claimed in claim 7 wherein already-detected, known symbols of the transmitted items of information are fed back to the connection separation and a time displacement between a known symbol and a symbol located in the connection separation is kept small.

10. The method as claimed in claim 1 wherein an estimation is carried out of a difference between a received symbol e(t) and an evaluated symbol and, if the difference is large, this difference is included in the step of forming reception signals and the step of separating items of information is again carried out.

11. The method as claimed in claim 7 wherein an estimation is carried out of a difference between a received symbol and an evaluated symbol and, if the difference is large, this difference is included in the step of forming reception signals and the step of separating items of information is again carried out.

12. The method as claimed in claim 8 wherein an estimation is carried out of a difference between a received symbol e(t) and an evaluated symbol and, if the difference is large, this difference is included in the step of forming reception signals and the step of separating items of information is again carried out.

13. A signal evaluation apparatus for detecting items of information of several individual connections k transmitted according to the DS-CDMA principle, the items being received simultaneously via a frequency channel and being dependent on a time t, wherein reception signals e(t) are represented in a base band by convolution of transmission signals $d_k(t)$ with individual channel coefficients $h_k(t)$ that represent transmission channels and with spread codes $c_k(t)$ of the individual connections k, the apparatus comprising:

a memory apparatus for storing spread codes $c_k(t)$ of at least two connections k;

means for separating items of information $g_k(t)$ related to the individual connections k in a first step, wherein mutual interferences between the connections are taken into accounts wherein the means for separating provides an expansion of a code matrix with the spread codes $c_k(t)$ of at least two connections k by means of additional indications, the code matrix itself or a pseudo-inverse of the code matrix being stored in the memory apparatus;

means for individually equalizing the items of information $g_k(t)$ related to the individual connections k in a second step which is subsequent to the first step; and means for detecting information that uses both the separated and equalized items of information of at least two connections k.

14. The signal evaluation apparatus as claimed in claim 13 wherein the memory apparatus stores the additional indications of the code matrix as already-detected items of information or, respectively, already-determined channel coefficients $h_k(t)$.

15. The signal evaluation apparatus as claimed in claim 13 wherein feedback of already-detected symbols to the means for separating is provided by the means for detecting.

16. The signal evaluation apparatus as claimed in claim 13 wherein a Viterbi equalizer is used as the means for individually equalizing.

17. The signal evaluation apparatus as claimed on claim 13 wherein a maximum likelihood estimator is used as the means for detecting.

* * * * *